United States Patent [19]

Magnier et al.

[11] Patent Number: 5,995,807
[45] Date of Patent: Nov. 30, 1999

[54] METHOD OF SWITCHING A CHANNEL FROM A FIRST PROPAGATION PATH TO A SECOND PROPAGATION PATH

[75] Inventors: Anne Magnier; Michel Cohen, both of Paris; Denis Rouffet, Boulogne; Gérald Sebastien, Les Clayes Sous Bois, all of France

[73] Assignee: Alcatel Espace, Cedex, France

[21] Appl. No.: 08/887,287

[22] Filed: Jul. 2, 1997

[30] Foreign Application Priority Data

Jul. 4, 1996 [FR] France .................................. 96 08339

[51] Int. Cl.⁶ .................................................. H04B 17/00
[52] U.S. Cl. ........................ 455/67.6; 455/62; 455/226.3
[58] Field of Search .................... 455/12.1, 13.1, 455/525, 67.6, 226.3, 62, 63; 370/318, 347

[56] References Cited

U.S. PATENT DOCUMENTS

| 5,001,776 | 3/1991 | Clark ..................................... 455/226.2 |
| 5,101,501 | 3/1992 | Gilhousen et al. ...................... 455/442 |
| 5,175,867 | 12/1992 | Wejke et al. ............................. 455/439 |
| 5,189,734 | 2/1993 | Bailey et al. ............................ 455/438 |
| 5,323,446 | 6/1994 | Kojima et al. ........................... 455/437 |
| 5,432,843 | 7/1995 | Bonta ..................................... 455/438 |
| 5,533,010 | 7/1996 | Tanaka .................................... 455/464 |
| 5,574,968 | 11/1996 | Olds et al. .............................. 455/428 |
| 5,710,791 | 1/1998 | Royer et al. ............................ 375/224 |
| 5,722,073 | 2/1998 | Wallstedt et al. ....................... 455/437 |

FOREIGN PATENT DOCUMENTS

| 0163281A2 | 12/1985 | European Pat. Off. . |
| 0696111A2 | 2/1996 | European Pat. Off. . |
| 4308161A1 | 9/1994 | Germany . |

*Primary Examiner*—Reinhard J. Eisenzopf
*Assistant Examiner*—Charles N. Appiah
*Attorney, Agent, or Firm*—Sughrue, Mion, Zinn Macpeak & Seas, PLLC

[57] ABSTRACT

The invention provides a method of switching a call set up between a first station and a second station from a current propagation path to a following propagation path. The method includes the following steps:

a value representative of signal-to-noise ratio is measured for each of said propagation paths, namely the current path and the following path; and the first station switches the call from a current channel on the current propagation path to a following channel on a following propagation path as a function of values representative of signal-to-noise ratio measured respectively for said current propagation path and for said following propagation path. In the method:

the following call channel is reserved for said call; and:
  in said second station, said call is switched from the current channel to said following channel in response to said call failing to be received in the current channel.

6 Claims, 6 Drawing Sheets

METHOD OF SWITCHING A CHANNEL FROM A FIRST PROPAGATION PATH TO A SECOND PROPAGATION PATH

The present invention relates generally to a method of switching a channel set up between a first station and a second station, from a first propagation path to a second propagation path.

FIELD OF THE INVENTION

The invention is applicable, for example, to a satellite telecommunications network for mobile stations, which network operates in a "switched diversity" mode in which a call set up between a first station, e.g. a base station, and a second station, e.g. a mobile terminal, can be transmitted over either one of two propagation paths, i.e. via one of two distinct satellites. The invention is also applicable to a terrestrial radiocommunications network.

Figure 1:
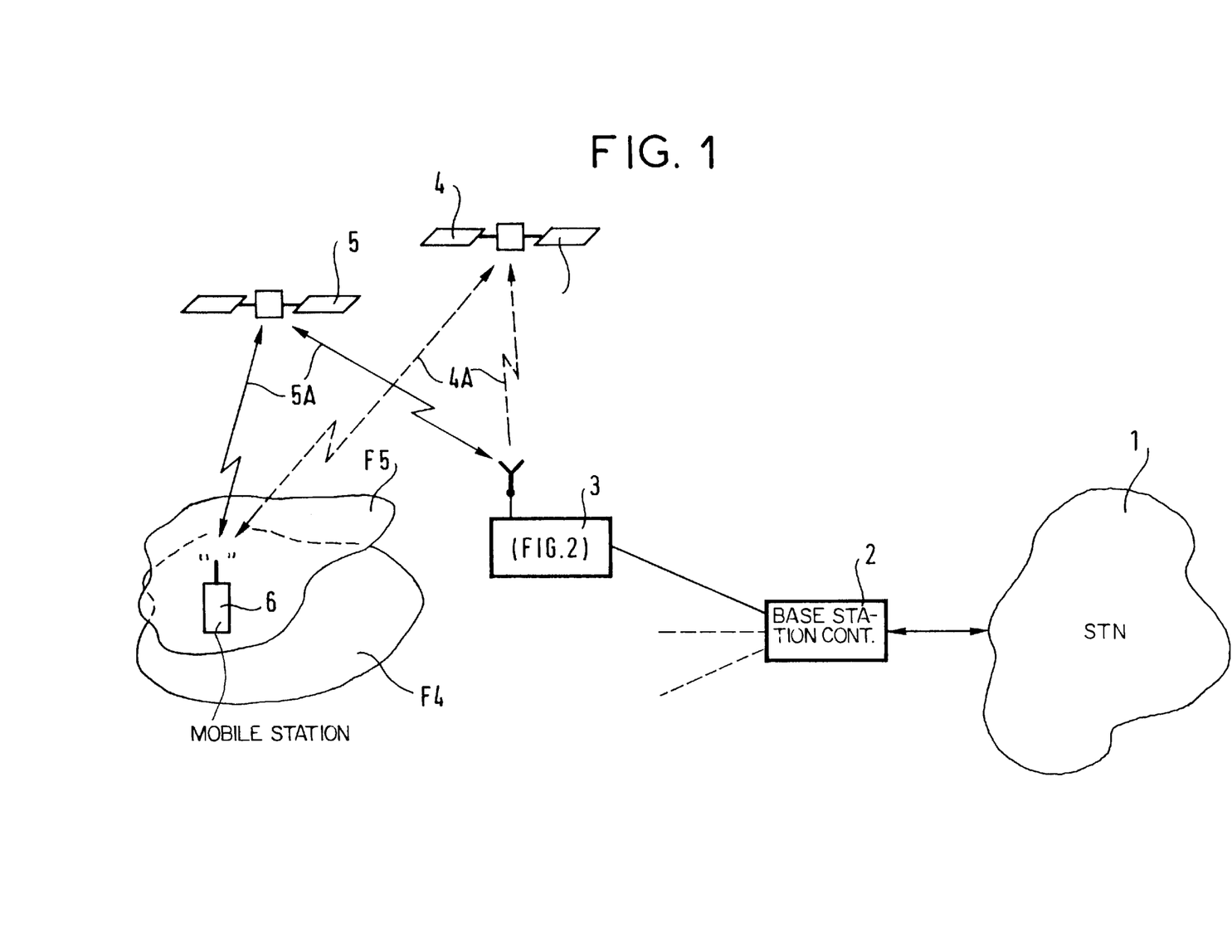
FIG. 1 is a diagram showing a telecommunications network for mobile terminals, which network implements the invention.

As shown in FIG. 1, in one configuration, a satellite telecommunications network implementing the invention includes firstly base station control and switching units 2 connected via PCM links to the switched telephone network STN, and, secondly multiple-access base stations 3 connected in clusters to said units. The units 2 route calls from and to mobile terminals 6 in a given geographical zone, and they govern one or more base stations 3. The base stations 3 serve in particular to transmit calls by radio to the mobile terminals 6, and to receive calls by radio therefrom.

BACKGROUND OF THE INVENTION

In a "switched diversity" satellite telecommunications network, a call, or channel, set up with a mobile terminal 6 is conveyed selectively over one of at least two propagation paths 4A and 5A. Propagation path selection is based on minimizing satellite transmission power for the call in question. Thus, the call set up with the mobile terminal 6 is switched to that one of the two propagation paths 4A or 5A, respectively associated with the two satellites 4 and 5, which enables satellite transmission power to be minimized for a given transmission quality. As seen from the terminal, the two propagation paths define between them a propagation time difference equal to the time difference between the respective instants at which data is received after being transmitted synchronously over the two propagation paths 4A and 5A. As a result, the switching procedure for switching between propagation paths must be associated with a synchronization procedure for synchronizing the terminal.

In the prior art, the European Telecommunications Standards Institute (ETSI) Recommendations for the Global System for Mobile communications (GSM) define a handover procedure for handing over between cells as follows. On a channel referred to as the "slow associated control channel" or "SACCH", a terminal sends the reception levels of channels referred to as "broadcast common channels" or "BCCHs" transmitted respectively by the current base station with which the call channel is set up, and by the adjacent base stations. As a function of the various power levels, the infrastructure makes the decision to switch the call from the current base station to a following base station. The current base station then transmits a handover request message to the terminal. The terminal responds by transmitting an access request message to the following base station immediately after receiving a message in a BCCH from said following base station. The following base station responds to the access request message by measuring a propagation time between itself and the mobile terminal, and by transmitting information to the terminal relating to a timing advance that the terminal should apply to its clock relative to what it believes to be the clock of the following station, so that the call data transmitted by the terminal is received by the following base station such that it is time synchronized in a time slot of a frame received by said following base station, taking into account the distance between the following base station and the terminal.

In a satellite network, that prior art solution is not very satisfactory. In such a network, the narrow margin of power allocated to each call in order to guarantee at least a minimum call quality gives rise to a rapid deterioration of the call in the presence of an obstacle, for example. Such rapid deterioration of the channels also applies to the control channels. This might then make it impossible for the terminal to receive a message requesting it to switch a channel from a first propagation path to a second propagation path, and as a result the call might be lost.

OBJECTS AND SUMMARY OF THE INVENTION

An object of the invention is to remedy that drawback by providing a method of switching between propagation paths that is particularly advantageous, e.g. in a satellite network.

To this end, the invention provides a method of switching a call, set up between a first station and a second station, from a current propagation path to a following propagation path, said method including the following steps:

a value representative of signal-to-noise ratio is measured for each of said propagation paths, namely the current path and the following path; and the first station switches the call from a current channel on the current propagation path to a following channel on a following propagation path as a function of values representative of signal-to-noise ratio measured respectively for said current propagation path and for said following propagation path;

wherein:

said following call channel is reserved for said call;

and wherein:

in said second station, said call is switched from the current channel to said following channel in response to said call failing to be received in the current channel.

When the transmission mode between first and second stations uses TDMA, the method includes a step in which the second station calculates a total propagation time difference between the current channel and the following channel as a function firstly:

a) of a propagation time difference between two respective reception instants at which test packets transmitted by the first station over respective ones of the two propagation paths are received;

and secondly:

b) of a timing advance which is a function of the distance between said second station and said first station.

A first station for implementing the method of the invention includes means for allocating transmit and receive means to the current channel, and also includes means for reserving transmit and receive means of the following channel.

A second station for implementing the method includes detection means for detecting a failure to receive information in said current channel, and means for switching transmission and reception of said call to said following channel in response to said detection means detecting a failure to receive information in said current channel.

BRIEF DESCRIPTION OF THE DRAWINGS

Other characteristics and advantages of the present invention appear more clearly on reading the following description given with reference to the corresponding accompanying drawings, in which.

MORE DETAILED DESCRIPTION

Figure 2:
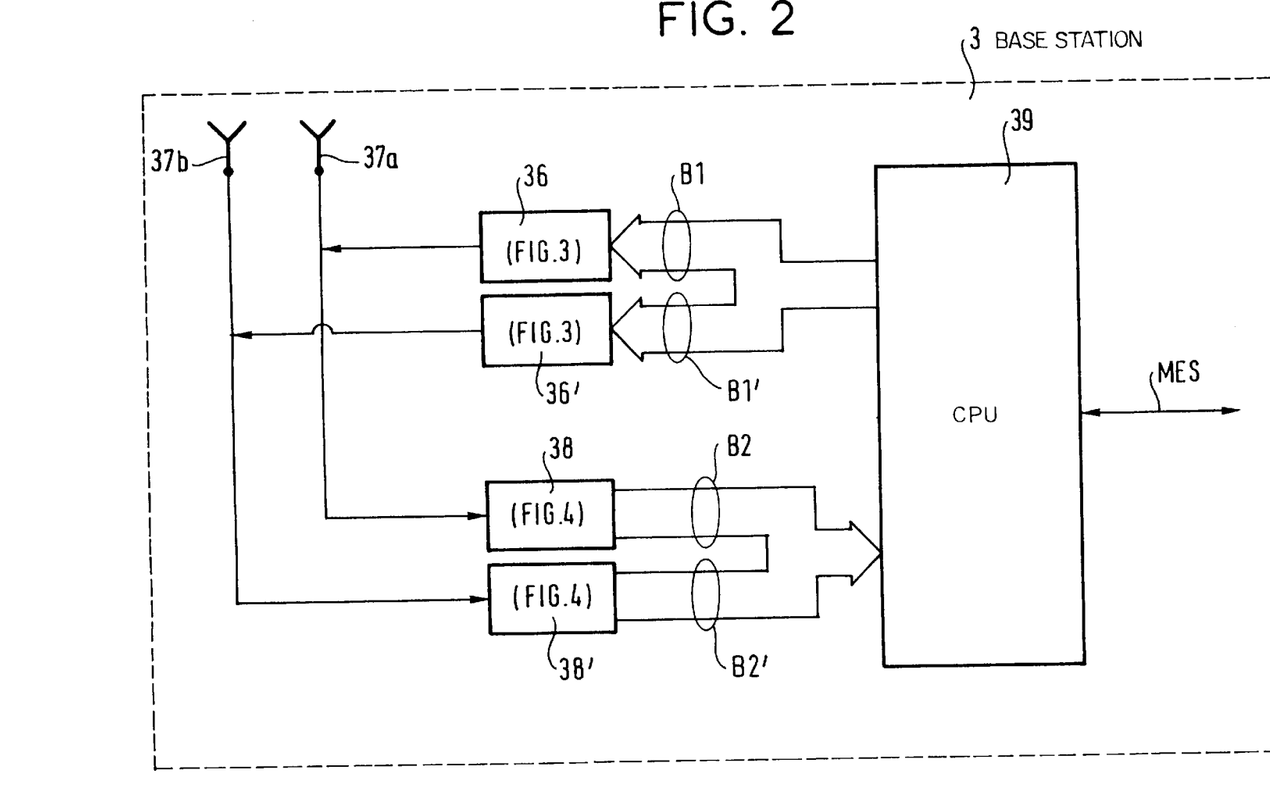
FIG. 2 is an overall block diagram of a base station forming part of the network shown in FIG. 1.

In the implementation described by way of non-limiting example, the invention uses a combined technique of code division multiple access (CDMA) and of time division multiple access (TDMA). With reference to FIGS. 1 and 2, a base station 3 implementing the invention includes a central processing unit 39, two transmit systems 36 and 36', and two receive systems 38 and 38'. An output of the transmit system 36 and an input of the receive system 38 are coupled to a first antenna 37a aimed at the satellite 4. An output of the transmit system 36' and an input of the receive system 38' are coupled to a second antenna 37b aimed at the satellite 5. As described in more detail below, in addition to serving as an interface with the base station control and switching unit 2, the central processing unit 39 serves to route channels, to calculate timing advances, and to switch channels between propagation paths 4A and 5A. The central processing unit is connected to the transmit system 36 via a transmit bus B1, to the transmit system 36' via a transmit bus B1', to the receive system 38 via a receive bus B2, and to the receive system 38' via a receive bus B2'.

Figure 3:
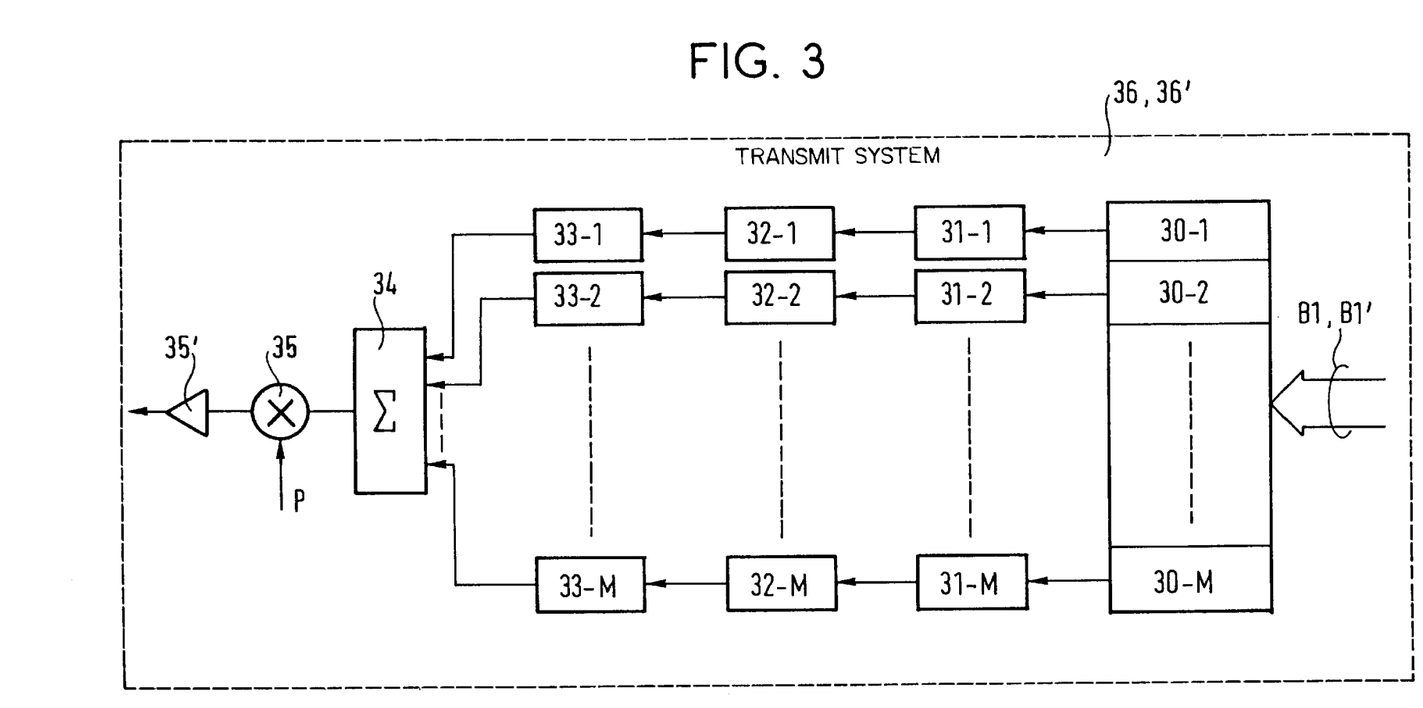
FIG. 3 is a block diagram of a transmit unit included in the base station shown in FIG. 2.

As shown in FIG. 3, each transmit system 36, 36' includes M transmit queues 30-1 to 30-M whose respective outputs are applied to inputs of M encoding and interleaving units 31-1 to 31-M. Respective outputs of the M encoding and interleaving units 31-1 to 31-M are applied to inputs of M QPSK modulation units 32-1 to 32-M. Respective outputs of the M QPSK modulation units 32-1 to 32-M are applied to respective inputs of M PN/Hadamard code modulation units 33-1 to 33-M. The outputs of the M PN/Hadamard code modulation units 33-1 to 33-M are applied to an adder 34 having an output applied to an input of a multiplier 35, an output of which is connected to an input of an amplifier 35'.

A person skilled in the art might find it useful to refer to U.S. Pat. No. 5,103,459, included by way of reference in the present application, to supplement the following description of how each transmit system 36 and 36' operates.

Each encoding and interleaving unit 31-1 to 31-M comprises an interleaving circuit and a convolution encoder, e.g. of the Viterbi type of constraint length K=7 and of ratio r=½. The encoder serves to implement encoding which guarantees the quality of the link. Such an encoding circuit is well known to a person skilled in the art. When m lies in the range 1 to M, the baseband data packets output by a queue 30-m are encoded and then interleaved by the unit 31-m. The resulting interleaved signal is phase modulated by quadrature phase shift keying (QPSK) by the unit 32-m. Said unit 32-m produces two signal components, namely an in-phase component and a quadrature component, each of which is applied to a code modulator 33-m.

In the implementation described herein, the network operates in a manner such that all of the signals transmitted within a cell (terrestrial network) or within a beam (satellite network) use the same pseudo-noise (PN) sequence which is different from a PN sequence used by an adjacent cell or beam. Within a cell, a signal addressed to a particular station, such as a terminal, is further encoded by a particular sequence from among a plurality of orthogonal sequences.

Typically, the PN sequences consist of identical pseudo-random sequences that are time offset relative to one another for distinct cells. For example, the orthogonal sequences may be Walsh functions, also known as "Hadamard sequences".

The Hadamard sequences are obtained from a Hadamard matrix of rank M, where M is a power of 2, such that:

$$H(M) = \begin{pmatrix} H(M/2) & H(M/2) \\ H(M/2) & -H(M/2) \end{pmatrix}, \text{ where}$$

$$H(2) = \begin{pmatrix} 1 & 1 \\ 1 & -1 \end{pmatrix}$$

A Hadamard sequence Hm, where m lies in the range 1 to M, is a respective one of the rows M of the Hadamard matrix. A Hadamard matrix of rank M thus contains M sequences, each of which has a length of M bits. Hadamard sequences of order M have the property that, over an interval of M symbols, the correlation between the various sequences is zero, it being understood that said various sequences are time aligned. This results from the fact that each sequence differs from any other sequence by one half of the bits of which it is composed.

Returning to FIG. 3, in the code modulation unit 33-m, where m lies in the range 1 to M, both of the quadrature QPSK signal components are multiplied by a Hadamard sequence Hm of rank m and by a PN sequence associated with the beam F4, F5 to produce two code modulated signals in quadrature. The various quadrature signals output by the various code modulation units 33-1 to 33-M are summed by means of the adder 34. By means of the multiplier 35, the resulting sum signal is modulated by a transmit carrier P prior to being amplified by the amplifier 35' and transmitted via the antenna 37a, 37b.

Figure 5:
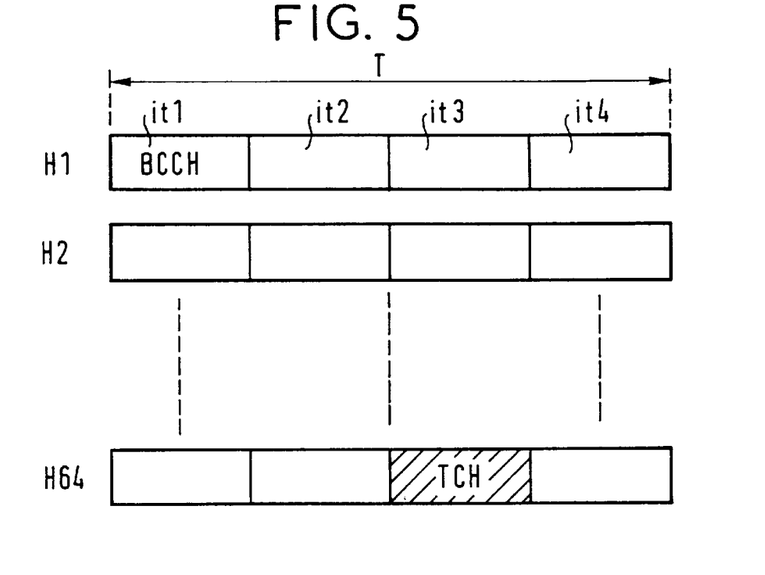
FIG. 5 is a diagram showing a structure transmitted by the base station.

The sum signal, or composite signal, transmitted via the antenna 37a, 37b is as shown in FIG. 5. For example, it may use an elementary pattern comprising a frame constituted by four times slots it1 to it4, this pattern being repeated at the frame frequency. The sum signal contains M frame signals, each frame signal being associated with a respective Hadamard sequence Hm, where m lies in the range 1 to M=64, for example, for a Hadamard matrix of rank M=64. A call channel referred to as a "traffic channel" or "TCH" set up in the network described in this example is defined by a time slot itj, where j lies in the range 1 to 4, by a Hadamard sequence Hm, and by a PN code.

Figure 4:
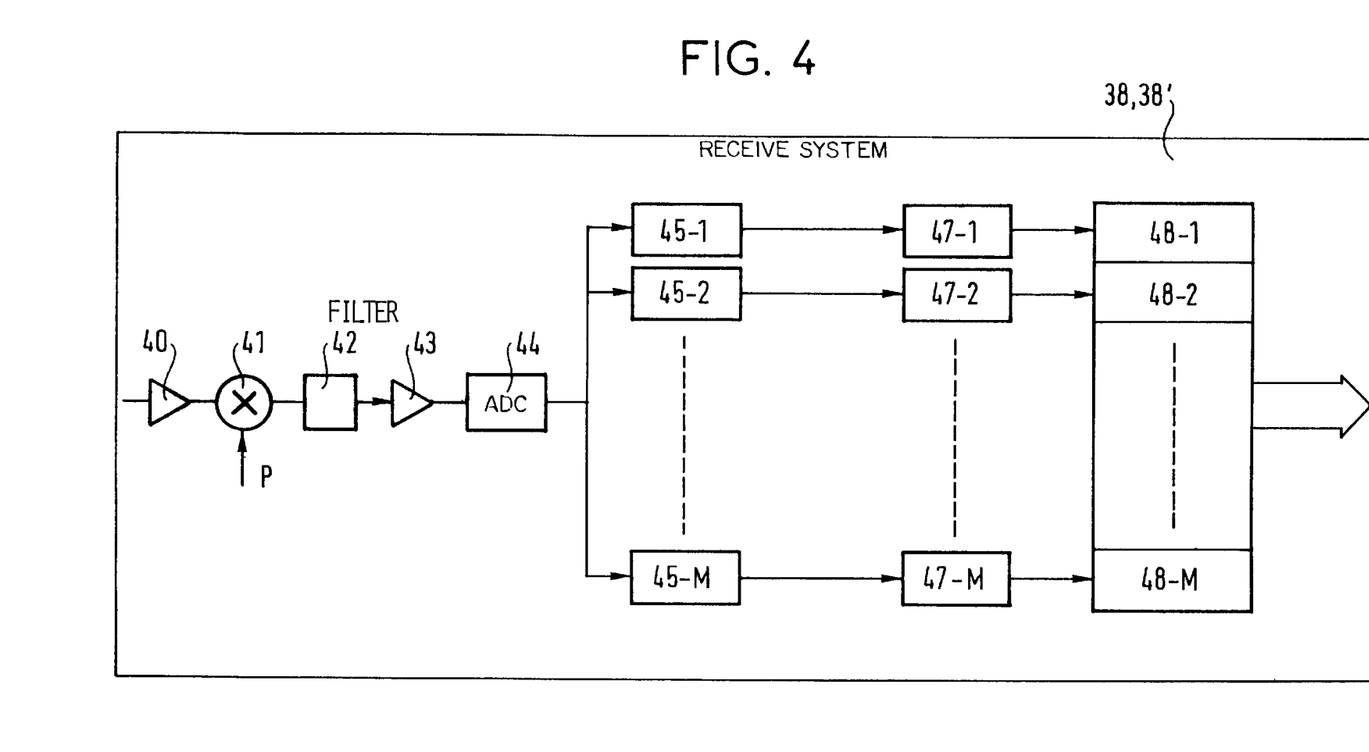
FIG. 4 is a block diagram of a receive unit included in the base station shown in FIG. 2.

With reference to FIG. 4, each receive system 38, 38' includes an RF amplifier 40, a multiplier 41, a filter 42, an IF amplifier 43, and an analog-to-digital converter 44 whose output is applied to respective inputs of M code demodulation units 45-1 to 45-M. M de-interleaving and decoding units 47-1 to 47-M receive, via respective inputs, the outputs of the M code demodulation units 45-1 to 45-M, and M queues 48-1 to 48-M receive, at their inputs, the respective outputs of the M de-interleaving and decoding units 47-1 to 47-M.

A person skilled in the art might find it useful to refer to above-mentioned U.S. Pat. No. 5,103,459 to supplement the following description of how each transmit system 36 and 36' operates. Signals transmitted by the various mobile stations 6 in a cell or in a beam are received in the form of frame signals as shown in FIG. 5. It is emphasized that the mobile stations are synchronized on transmission using the procedure for matching transmit instants, which procedure is referred to as the "timing advance" procedure in GSM. For this purpose, prior to setting up a call, a mobile terminal 6 triggers a transmission over a channel referred to as a "random access channel" or "RACH" relating to the synchronization that it has received from the base station 3. This transmission makes it possible for the base station to measure twice the terminal-to-base station propagation time. The base station responds by allocating the terminal a channel referred to as a "slow associated control channel" or "SACCH" in which timing advance information is conveyed relating to the timing advance that said terminal must give to its clock relative to what it believes is the clock of the base station, so that the data subsequently transmitted by the terminal coincides with a given time slot in the frame. The timing advance information in the present method must have much greater precision than that of GSM to take the CDMA modulation into account. A number of bits higher than that defined for this purpose in GSM is therefore used in the SACCH.

The base station 3 thus receives the various channels over time slots that are synchronized, and modulated by Hadamard sequences, as shown in FIG. 5 which shows M frame signals relating to a beam or a cell.

As shown in FIG. 4, the various signals are successively RF amplified by the amplifier 40, demodulated in the multiplier 41 by a demodulation carrier P produced by a generator (not shown), band-pass filtered by the filter 42, IF amplified 43, and subjected to analog-to-digital conversion 44. The composite signal output by the analog-to-digital converter 44 is applied to the respective inputs of M code demodulation units 33-1 to 33-M. Each code demodulation unit 45-m, where m lies in the range 1 to M, comprises a QPSK/PN correlator and a fast Hadamard transform in cascade. A signal output by a code demodulation unit is applied to a respective one of the de-interleaving and decoding units 47-m. At the output of each de-interleaving and decoding unit 47-m the baseband signal is produced that corresponds to the frames "carried" by a respective one of the Hadamard sequences Hm, where m lies in the range 1 to M=64. The baseband signal output by each de-interleaving and decoding unit 47-m is applied to a respective queue 48-1 so as to be read and routed by the central processing unit 39 to a base station control and switching unit 2.

With reference to FIGS. 1, 5, 6, and 7, the method of the invention is described in more detail below. It is assumed in the implementation given by way of example that each terminal operates in a time duplexing mode. As a result, as seen from the terminal, over a frame duration T, a receive window is provided that corresponds to a time slot it1 to it4, and a transmit window is provided that is separated in time from the receive window, the two windows together taking up a duration shorter than a frame duration T. As shown in FIG. 1, the two satellites 4 and 5 define respective coverage zones or beams F4 and F5 defined by different PN codes.

The transmit system 36 and the receive system 38 are associated with the coverage zone F4, while the transmit system 36' and the receive system 38' are associated with the coverage zone F5. A given terminal 6 is located both in the coverage zone F4 of the satellite 4, and in the coverage zone F5 of the satellite 5. Each transmit system 36 and 36' in the base station 3 transmits a control channel referred to as a "broadcast common channel" or "BCCH" continuously, at the frame frequency, in a given time slot (it1 in this example) of one of the M frame signals associated with a respective Hadamard sequence (H1 in this example).

Figure 6:
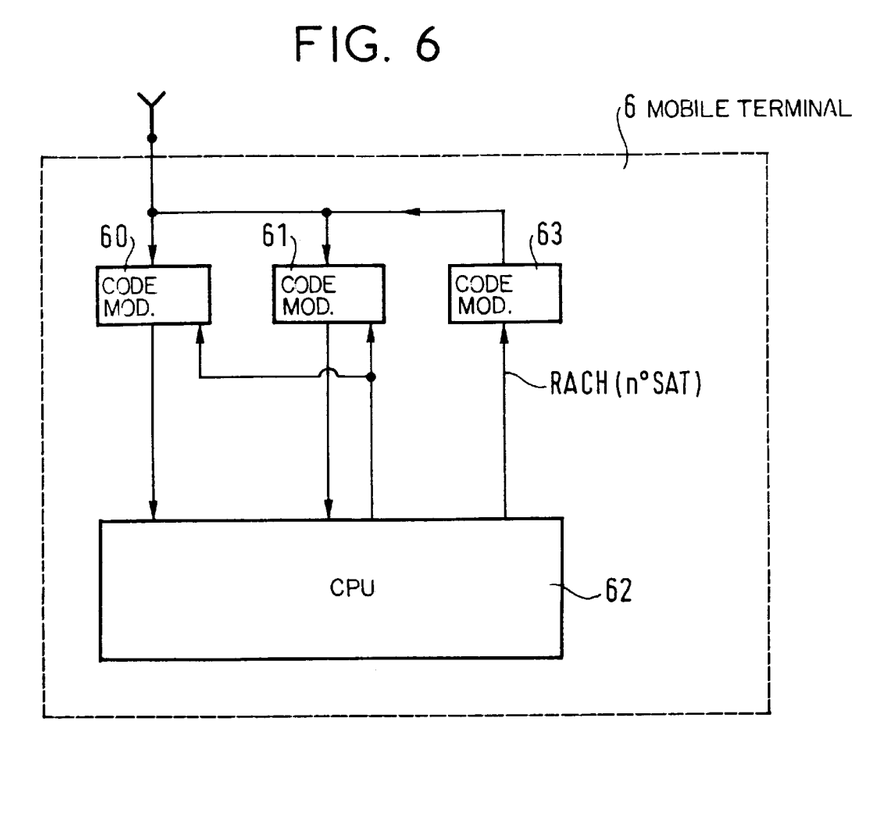
FIG. 6 is a block diagram of a terminal for implementing the invention.

The terminal, or second station, 6 includes two code demodulation units 60 and 61, a code modulation unit 63, and a central processing unit 62.

Figure 7:
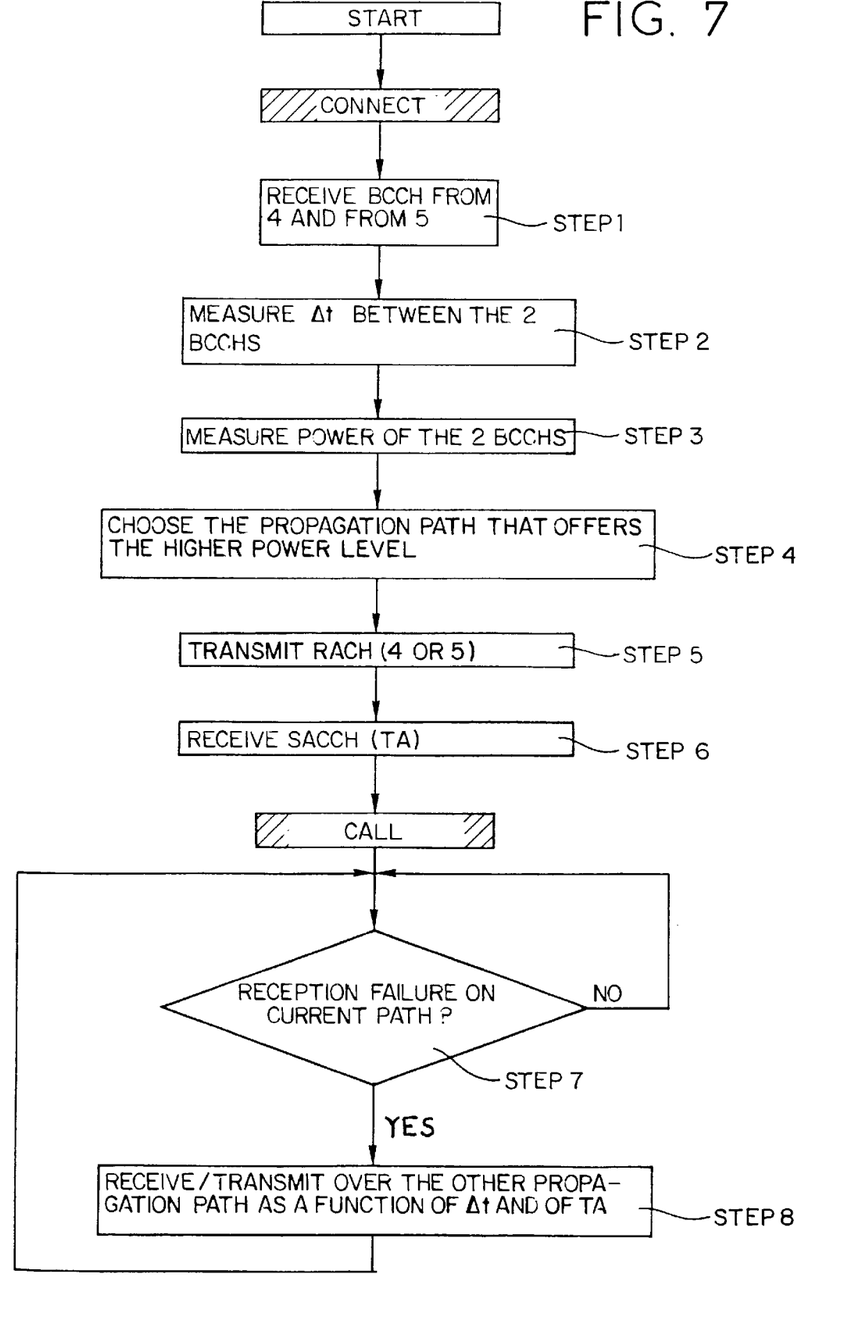
FIG. 7 is an operating algorithm of the terminal.

The two code demodulation units 60 and 61 receive, via the antenna of the terminal 6, the composite signals respectively transmitted by the two transmit systems 36 and 36' in the base station 3 (FIG. 7, step 1). On initialization of the terminal 6, the demodulation unit 60 acquires Hadamard code and PN code synchronization relative to the frame signal carrying the BCCH transmitted by the transmit system 36 of the base station 3. At the same time, the demodulation unit 61 acquires Hadamard code and PN code synchronization relative to the frame signal carrying the BCCH transmitted by the transmit system 36' of the base station 3. The two code demodulation units 60 and 61 thus output respective ones of the two baseband BCCH signals received via the satellites 4 and 5. These two BCCH signals are applied to the central processing unit 62. The central processing unit periodically measures a value representative of a signal-to-noise ratio, e.g. a power level or a bit error rate, for each of the two BCCH signals received via respective ones of the two propagation paths 4A and 5A (FIG. 7, step 3).

Furthermore, the central processing unit 62 measures a propagation time difference $\Delta t$ between the two BCCHs which are transmitted synchronously over the two propagation paths 4A and 5A by respective ones of the transmit systems 36 and 36' in the base station 3 (FIG. 7, step 2). In practice, since the propagation time difference $\Delta t$ can be greater than a frame duration, provision is made for a BCCH to convey frame rank information, as stipulated for other reasons in the GSM Recommendations. Thus, the central processing unit 62 measures a propagation time difference $\Delta t$ between the two BCCHs by adding an apparent propagation time difference to a propagation time difference equal to the difference between the frame ranks in the two BCCHs multiplied by the frame duration T.

To set up a call, whether it be an incoming call or an outgoing call, the terminal transmits an access request message in a RACH via a code modulation unit 63 (FIG. 7, step 5). The message is transmitted immediately after a BCCH signal has been received. For an incoming call, prior to transmitting an access request message, the terminal receives an incoming call message in the two BCCHs of the two composite signals respectively received via the two propagation paths. The RACH access request message includes information identifying which one of the propagation paths 4A, 5A offers the higher value representative of signal-to-noise ratio. The propagation path that offers said higher value is identified as a result of the central processing unit 62 periodically measuring a value representative of a signal-to-noise ratio for each of the two BCCH signals respectively received over the two propagation paths 4A and 5A. The RACH access request message is transmitted over the return link of the propagation path that offers the higher value representative of signal-to-noise ratio (FIG. 7, step 4).

As is performed in GSM, on receiving the access request message from the terminal, the base station 3 measures twice the terminal-to-base station propagation time. The base station responds by allocating the mobile station a SACCH (FIG. 7, step 6) which conveys a timing advance (TA) that the mobile station must apply to its clock relative to what it believes to be the clock of the base station, so that the data subsequently transmitted by the mobile station coincides with a given time slot it1 to it4 of a frame signal received by the base station 3. The timing advance is a function of the distance between the terminal and the base station. At the same time, via a channel referred to as an "access grant channel" or "AGCH", the base station 3 allocates the terminal 6 a call channel (TCH) in the form of time slot rank it1 to it4 and of a Hadamard sequence H1 to H64, the terminal having already acquired PN code synchronization.

A call in a "current" TCH is then set up between the terminal 6 and the base station 3. For example, this channel is set up over the propagation path 4A, and it uses the transmit unit 36 and the receive unit 38 in the base station 3. According to an important characteristic of the invention, on setting up the call, an associated TCH that is not used immediately is reserved for the terminal 6 for the propagation path 5A, this associated channel using the transmit unit 36' and the receive unit 38' in the base station 3. For this purpose, resources useful for transmitting and receiving the associated TCH are reserved in the units 36' and 38' by the unit 39. Information required for identifying the associated TCH is transmitted from the station 3 to the terminal 6.

During the call, initially set up over the propagation path 4A, the terminal periodically transmits, in the SACCH, the values representative of signal-to-noise ratio that are periodically measured by the central processing unit 63 for each of the two BCCH signals respectively received over the two propagation paths 4A and 5A. As a function of these values, the base station takes the decision to switch the current call channel conveyed in the current TCH over to the associated TCH, or "following" channel. This switching takes places without the terminal 6 being informed of it. In the terminal, on detecting a failure to receive information in the current TCH which is allocated to the terminal 6, the central processing unit 62 then takes the initiative of switching transmission and reception over to the associated TCH (FIG. 7, step 7). It modifies accordingly the programming of the PN codes, and possibly the Hadamard sequence programming and the time slot programming in the receive unit 60 or 61 and the in the transmit unit 63. This switching over from the current channel to the following associated channel causes re-synchronization to take place in the terminal 6 as a result of the propagation time difference that exists between the two propagation paths 5A and 5B. This re-synchronization is performed by the terminal as a function of timing advance (TA) information and of propagation time difference Δt information stored in the central processing unit 62. For this purpose, the terminal sums the two items of information expressed in algebraic terms so as to deduce therefrom a total propagation time difference (FIG. 7, step 8). The following channel then becomes a current channel, and the current channel becomes a following channel.

The invention is not limited to the implementation described, and it extends to all types of telecommunications networks.

We claim:

1. A method of switching a call, set up between a first station and a second station, from a current propagation path to a following propagation path, said method including the following steps:

measuring a value representative of signal-to-noise ratio for each of said propagation paths, namely the current path and the following path; and causing the first station to switch the call from a current channel on the current propagation path to a following channel on a following propagation path as a function of values representative of signal-to-noise ratio measured respectively for said current propagation path and for said following propagation path;

reserving said following channel for said call and in said second station, switching said call from the current channel to said following channel in response to said call failing to be received in the current channel.

2. A first station for implementing the method according to claim 1, the first station including means for allocating transmit and receive means to the current channel, said first station including means for reserving transmit and receive means of the following channel.

3. A second station for implementing the method according to claim 1, said second station including detection means for detecting a failure to receive information in said current channel, and means for switching transmission and reception of said call to said following channel in response to said detection means detecting a failure to receive information in said current channel.

4. The method according to claim 1, wherein said first and second propagation paths are in a satellite communications network, and wherein said call is switched from said current channel to said following channel only in response to said call failing to be received in said current channel.

5. A method of switching a call, set up between a first station and a second station, from a current propagation path to a following propagation path in a telecommunications network using a TDMA-type channel transmit/receive mode, said method comprising the following steps:

measuring a value representative of signal-to-noise ratio for each of said propagation paths, namely the current path and the following path;

causing the first station to switch the call from a current channel on the current propagation path to a following channel on the following propagation path as a function of values representative of signal-to-noise ratio measured respectively for said current propagation path and for said following propagation path;

reserving said following channel for said call;

in said second station, switching said call from the current channel to said following channel in response to said call failing to be received in the current channel; and in the second station, calculating a total propagation time difference between said current channel and said following channel as a function of:

a) firstly, a propagation time difference between two respective reception instants at which test packets transmitted by the first station over respective ones of the two propagation paths are received; and b) secondly, a timing advance which is a function of the distance between said second station and said first station.

6. A second station for implementing the method according to claim 5, said second station comprising detection means for detecting a failure to receive information in said current channel, and means for switching transmission and reception of said call to said following channel in response to said detection means detecting the failure to receive information in said current channel, and further comprising means for calculating the total propagation time difference between said current channel and said following channel as a function of:

a) firstly, the propagation time difference between the two respective reception instants at which the test packets transmitted by the first station over the respective ones of the two propagation paths are received; and b) secondly, the timing advance which is the function of the distance between said second station and said first station.

\* \* \* \* \*